(12) United States Patent
Chang et al.

(10) Patent No.: US 7,817,722 B2
(45) Date of Patent: Oct. 19, 2010

(54) METHODS AND ARCHITECTURE FOR INDEXING AND EDITING COMPRESSED VIDEO OVER THE WORLD WIDE WEB

(75) Inventors: Shih-Fu Chang, New York, NY (US); Horace J. Meng, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1673 days.

(21) Appl. No.: 10/728,345

(22) Filed: Dec. 4, 2003

(65) Prior Publication Data
US 2008/0131072 A1 Jun. 5, 2008

Related U.S. Application Data

(62) Division of application No. 09/423,769, filed on Mar. 14, 2000, now Pat. No. 6,735,253.

(51) Int. Cl.
*H04N 7/18* (2006.01)
(52) U.S. Cl. .............................. 375/240.25; 375/240.01
(58) Field of Classification Search ............................... 375/240.01–240.29
See application file for complete search history.

(56) References Cited

U.S. PATENT DOCUMENTS

| | | | |
|---|---|---|---|
| 5,191,645 A | 3/1993 | Carlucci et al. ............. 345/723 |
| 5,204,706 A | 4/1993 | Saito .......................... 352/129 |
| 5,262,856 A | 11/1993 | Lippman et al. ........ 375/240.12 |
| 5,408,274 A | 4/1995 | Chang et al. ................. 348/700 |
| 5,461,679 A | 10/1995 | Normile et al. ............. 382/304 |
| 5,606,655 A | 2/1997 | Arman et al. ................ 345/440 |
| 5,767,922 A | 6/1998 | Zabih et al. .................. 348/700 |
| 5,870,754 A | 2/1999 | Dimitrova et al. ........ 707/104.1 |
| 5,893,095 A | 4/1999 | Jain et al. |
| 5,995,095 A | 11/1999 | Ratakonda ................ 715/500.1 |
| 6,041,079 A * | 3/2000 | Yim ......................... 375/240.2 |
| 6,075,875 A | 6/2000 | Gu .............................. 382/107 |
| 6,100,930 A * | 8/2000 | Kolczynski .............. 348/408.1 |
| 6,104,411 A | 8/2000 | Ito et al. ....................... 345/440 |
| 6,125,229 A | 9/2000 | Dimitrova et al. ............. 386/69 |
| 6,252,975 B1 | 6/2001 | Bozdagi et al. ............. 382/107 |
| 6,327,390 B1 | 12/2001 | Sun et al. .................... 382/235 |
| 6,628,824 B1 | 9/2003 | Belanger |
| 6,940,910 B2 * | 9/2005 | Jun et al. ................ 375/240.26 |
| 2007/0237426 A1 | 10/2007 | Xie et al. |

OTHER PUBLICATIONS

J. Meng and S.-F.Chang, "Tools for Compressed-Domain Video Indexing and Editing," SPIE Conference on Storage and Retrieval for Image and Video Database, vol. 2670 (1996).

(Continued)

*Primary Examiner*—Andy S Rao
(74) *Attorney, Agent, or Firm*—Baker Botts LLP

(57) ABSTRACT

A system and method is provided for editing and parsing compressed digital information. The compressed digital information may include visual information which is edited and parsed in the compressed domain. In a preferred embodiment, the present invention provides a method for detecting moving objects in a compressed digital bitstream which represents a sequence of fields or frames of video information for one or more captured scenes of video.

3 Claims, 11 Drawing Sheets

OTHER PUBLICATIONS

Zhong et al., "Clustering Methods for Video Browsing and Annotation," Storage and Retrieval for Still Image and Video Databases IV, IS & T/SPIE's Electronic Images: Science & Tech. 96, vol. 2670 (1996).

B. Shahraray, "Scene Change Detection and Content-Based Sampling of VideoSequences," SPIE Conf. Digital Image Compression: Algorithms and Technologies 1995, vol. 2419.

J. Meng et al., "Scene Change Detection in a MPEG Compressed Video Sequence," IS & T/SPIE Symposium Proceedings, vol. 2419, Feb. 1995.

M.M. Yeung, et al. "Video Browsing using Clustering and Scene Transitions on Compressed Sequences," IS & T/SPIE Symposium Proceedings, Feb. 1995, vol. 2417, pp. 399-413.

H.S. Sawhney, et al., "Model-Based 2D & 3D Dominant Motion Estimation for Mosaicking and Video Representation," Proc. Fifth Int'l conf. Computer Vision, Los Alamitos, CA., 1995, pp. 583-390.

S.-F. Chang, "Compressed-Domain Techniques for Image/Video Indexing and Manipulation," IEEE Intern. Conf. on Image Processing, ICIP 95, Special Session on Digital Image/Video Libraries and Video-on-demand, Oct. 1995, Washington DC.

S.W. Smoliar et al., "Content-Based Video Indexing andRetrieval," IEEE Multimedia, summer 1994, pp. 62-72.

F. Arman et al., "Image Processing on Compressed Data for Large Video Databases," Proceedings of ACM Multimedia'93, Jun. 1993, pp. 267-272.

A. Akutsu et al., "Video Indexing Using MotionVectors," SPIE Visual Communications and Image Processing 1992, vol. 1818, pp. 1522-1530.

Y.T. Tse et al., "Global Zoom/Pan Estimation and Compensation for Video Compression" Proceedings of ICASSP 1991,pp.2725-2728.

Bayram et al.: "Image Manipulation Detection,", Journal of Electronic Imaging 15(4), 041102, (Oct.-Dec. 2006).

Fridich et al.: "Detection of Copy-Move Forgery in Digital Images", *Proc. Of DFRWS 2003*, Cleveland, OH, USA, Aug. 5-8, 2003.

* cited by examiner

|  | INPUT VIDEO |
|---|---|
| DISPLAY ORDER | . . $B_{-2} B_{-1} I_0 B_1 B_2 P_3$ . . |
| STORAGE ORDER | . . $I_0 B_{-2} B_{-1} P_3 B_1 B_2$ . . |

| APPROACH 1 | OUTPUT VIDEO, RATE = 1/2 |
|---|---|
| DISPLAY ORDER | . . $B_{-2} B'_{-2} B_{-1} B'_{-1} I_0 P B_1 B'_1 B_2 B'_2 P_3 P$ . . |
| STORAGE ORDER | . . $I_0 B_{-2} B'_{-2} B_{-1} B'_{-1} P P_3 B_1 B'_1 B_2 B'_2 P$ . . |

FRAMES WITH PRIME' ARE DUPLICATED FRAMES
P: DUPLICATED

| APPROACH 2 | OUTPUT VIDEO, RATE = 1/3 |
|---|---|
|  | CONVERT ORIGINAL B/P TO I |
| DISPLAY ORDER | . . $I_0 PP\ I_1 PP\ I_2 PP\ I_3 PP$ . . |
|  | INSERT DUPLICATED P |

METHODS AND ARCHITECTURE FOR INDEXING AND EDITING COMPRESSED VIDEO OVER THE WORLD WIDE WEB

This application is a Divisional of: Ser. No. 09/423,769 filed Mar. 14, 2000, now U.S. Pat. No. 6,735,253, incorporated by reference herein, which is based upon: prior application No. PCT/US97/08266, incorporated by reference herein.

NOTICE OF GOVERNMENT RIGHTS

The U.S. Government has certain rights in this invention pursuant to the terms of the National Science Foundation CAREER award IRI-9501266.

BACKGROUND OF THE INVENTION

I. Field of the Invention

The present invention relates to techniques for editing and parsing compressed digital information, and more specifically, to editing and parsing visual information in the compressed domain.

II. Description of the Related Art

With the increasing use of local area, wide area and global networks to spread information, digital video has become an essential component of many new media applications. The inclusion of video in an application often gives the application not only increased functional utility, but also an aesthetic appeal that cannot be obtained by text or audio information alone. However, while digital video greatly increases our ability to share information, it demands special technical support in processing, communication, and storage.

In order to reduce bandwidth requirements to manageable levels, video information is generally transmitted between systems in the digital environment the form of compressed bitstreams that are in a standard format, e.g., Motion JPEG, MPEG-1, MPEG-2, H.261 or H.263. In these compressed formats, the Discrete Cosine Transform ("DCT") is utilized in order to transform N×N blocks of pixel data, where n typically is set to eight, into the DCT domain where quantization is more readily performed. Run-length encoding and entropy coding (i.e., Huffman coding or arithmetic coding) are applied to the quantized bitstream to produce a compressed bitstream which has a significantly reduced bit rate than the original uncompressed source signal. The process is assisted by additional side information, in the form of motion vectors, which are used to construct frame or field-based predictions from neighboring frames or fields by taking into account the inter-frame or inter-field motion that is typically present.

In order to be usable by a receiving system, such coded bitstreams must be both parsed and decoded. For example, in the case of an MPEG-2 encoded bitstream, the bitstream must be parsed into slices and macroblocks before the information contained in the bitstream is usable by an MPEG-2 decoder. Parsed bitstream information may be used directly by an MPEG-2 decoder to reconstruct the original visual information, or may be subjected to further processing.

In the case of compressed digital video, further processing of video information can occur either in the normal, uncompressed domain or in the compressed domain. Indeed, there have been numerous attempts by others in the field to realize useful techniques for indexing and manipulating digital video information in both the uncompressed and compressed domains.

For example, in the article by S. W. Smoliar et al., "Content-Based Video Indexing and Retrieval," IEEE Multimedia, summer 1994, pp. 62-72, a color histogram comparison technique is proposed to detect scene cuts in the spatial (uncompressed) domain. In the article by B. Shahraray, "Scene Change Detection and Content-Based Sampling of Video Sequences," SPIE Conf. Digital Image Compression: Algorithms and Technologies 1995, Vol. 2419, a block-based match and motion estimation algorithm is presented.

For compressed video information, the article by F. Arman et al., "Image Processing on Compressed Data for Large Video Databases," Proceedings of ACM Multimedia '93, June 1993, pp. 267-272, proposes a technique for detecting scene cuts in JPEG compressed images by comparing the DCT coefficients of selected blocks from each frame. Likewise, the article by J. Meng et al., "Scene Change Detection in a MPEG Compressed Video Sequence," IS&T/SPIE Symposium Proceedings, Vol. 2419, February 1995, San Jose, Calif., provides a methodology for the detection of direct scene cuts based on the distribution of motion vectors, and a technique for the location of transitional scene cuts based on DCT DC coefficients. Algorithms disclosed in the article by M. M. Yeung, et al. "Video Browsing using Clustering and Scene Transitions on Compressed Sequences," IS&T/SPIE Symposium Proceedings, February 1995, San Jose, Calif. Vol. 2417, pp. 399-413, enable the browsing of video shots after scene cuts are located. However, the Smoliar et al., Shahraray, and Arman et al. references are limited to scene change detection, and the Meng et al. and Yeung et al. references do not provide any functions for editing compressed video.

Others in the field have attempted to address problems associated with camera operation and moving objects in a video sequence. For example, in the spatial domain, H. S. Sawhney, et al., "Model-Based 2D & 3D Dominant Motion Estimation for Mosaicking and Video Representation," Proc. Fifth Int'l conf. Computer Vision, Los Alamitos, Calif., 1995, pp. 583-390, proposes to find parameters of an affine matrix and to construct a mosaic image from a sequence of video images. In similar vain, the work by A. Nagasaka et al., "Automatic Video Indexing and Full-Video Search for Object Appearances," in E. Knuth and L. M. Wegner, editors, Video Database Systems, II, Elsevier Science Publishers B. V., North-Holland, 1992, pp. 113-127, proposes searching for object appearances and using them in a video indexing technique.

In the compressed domain, the detection of certain camera operations, e.g., zoom and pan, based on motion vectors have been proposed in both A. Akutsu et al., "Video Indexing Using Motion Vectors," SPIE Visual Communications and Image Processing 1992, Vol. 1818, pp. 1522-1530, and Y. T. Tse et al., "Global Zoom/Pan Estimation and Compensation For Video Compression" Proceedings of ICASSP 1991, pp. 2725-2728. In these proposed techniques, simple three parameter models are employed which require two assumptions, i.e., that camera panning is slow and focal length is long. However, such restrictions make the algorithms not suitable for general video processing.

There have also been attempts to develop techniques aimed specifically at digital video indexing. For example, in the aforementioned Smoliar et al. article, the authors propose using finite state models in order to parse and retrieve specific domain video, such as news video. Likewise, in A. Hampapur, et al., "Feature Based Digital Video Indexing," IFIP2.6 Visual Database Systems, III, Switzerland, March, 95, a feature based video indexing scheme using low level machine derivable indices to map into the set of application specific video indices is presented.

One attempt to enable users to manipulate image and video information was proposed by J. Swartz, et al., "A Resolution Independent Video Language," Proceedings of ACM Multimedia '95, pp. 179-188, as a resolution independent video language (Rivl). However, although Rivl uses group of pictures (GOPs) level direct copying whenever possible for "cut and paste" operations on MPEG video, it does not use operations in the compressed domain at frame and macroblock levels for special effects editing. Instead, most video effects in Rivl are done by decoding each frame into the pixel domain and then applying image library routines.

The techniques proposed by Swartz et al. and others which rely on performing some or all video data manipulation functions in the uncompressed domain do not provide a useful, truly comprehensive technique for indexing and manipulating digital video. As explained in S.-F. Chang, "Compressed-Domain Techniques for Image/Video Indexing and Manipulation," IEEE Intern. Conf. on Image Processing, ICIP 95, Special Session on Digital Image/Video Libraries and Video-on-demand, October 1995, Washington D.C., the disclosure of which is incorporated by reference herein, the compressed-domain approach offers several powerful benefits.

First, implementation of the same manipulation algorithms in the compressed domain is much cheaper than that in the uncompressed domain because the data rate is highly reduced in the compressed domain (e.g., a typical 20:1 to 50:1 compression ratio for MPEG). Second, given most existing images and videos stored in the compressed form, specific manipulation algorithms can be applied to the compressed streams without full decoding of the compressed images/videos. In addition, because that full decoding and re-encoding of video are not necessary, manipulating video in the compressed domain avoids the extra quality degradation inherent in the reencoding process. Thus, as further explained in the article by the present inventors, J. Meng and S.-F. Chang, "Tools for Compressed-Domain Video Indexing and Editing," SPIE Conference on Storage and Retrieval for Image and Video Database, Vol. 2670, San Jose, Calif., February 1996, the disclosure of which is incorporated by reference herein, for MPEG compressed video editing, speed performance can be improved by more than 60 times and the video quality can be improved by about 3-4 dB if a compressed-domain approach is used rather than a traditional decode-edit-reencode approach.

A truly comprehensive technique for indexing and manipulating digital video must meet two requirements. First, the technique must provide for key content browsing and searching, in order to permit users to efficiently browse through or search for key content of the video without full decoding and viewing the entire video stream. In this connection, "key content" refers to key frames in video sequences, prominent video objects and their associated visual features (motion, shape, color, and trajectory), or special reconstructed video models for representing video content in a video scene. Second, the technique must allow for video editing directly in the compressed domain to allow users to manipulate an specific object of interest in the video stream without having to fully decode the video. For example, the technique should permit a user to cut and paste any arbitrary segment from an existing video stream to produce a new video stream which conforms to the valid compression format.

Unfortunately, none of the prior art techniques available at present are able to meet these requirements. Thus, the prior art techniques fail to permit users who want to manipulate compressed digital video information with the necessary tools to extract a rich set of visual features associated with visual scenes and individual objects directly from compressed video so as not only to enable content based query searches, but also to allow for integration with domain knowledge for derivation of higher-level semantics.

SUMMARY OF THE INVENTION

An object of the present invention is to provide comprehensive techniques for indexing and manipulating digital video in the compressed domain.

Another object of the present invention is to provide techniques for key content browsing and searching of compressed digital video without decoding and viewing the entire video stream.

A further object of the present invention is to provide techniques which allow for video editing directly in the compressed domain A still further object of the present invention is to provide tools that permit users who want to manipulate compressed digital video information to extract a rich set of visual features associated with visual scenes and individual objects directly from compressed video.

Yet another object of this invention is to provide an architecture which permits users to manipulate compressed video information over a distributed network, such as the Internet.

In order to meet these and other objects which will become apparent with reference to further disclosure set forth below, the present invention provides a method for detecting moving video objects in a compressed digital bitstream which represents a sequence of fields or frames of video information for one or more previously captured scenes of video. The described method advantageously provides for analyzing a compressed bitstream to locate scene cuts so that at least one sequence of fields or frames of video information which represents a single video scene is determined. The method also provides for estimating one or more operating parameters of a camera which initially captured the video scene, by analyzing a portion of the compressed bitstream which corresponds to the video scene, and for detecting one or more moving video objects represented in the compressed bitstream by applying global motion compensation with the estimated camera operating parameters.

In a preferred process, the compressed bitstream is a bitstream compressed in accordance with the MPEG-1, MPEG-2, H261, or H263 video standard. In this preferred embodiment, analyzing can beneficially be accomplished by parsing the compressed bitstream into blocks of video information and associated motion vector information for each field or frame of video information which comprises the determined sequence of fields or frames of video information representative of said single scene, performing inverse motion compensation on each of the parsed blocks of video information to derive discrete cosign transform coefficients for each of the parsed blocks of video information, counting the motion vector information associated with each of the parsed blocks of video information, and determining from the counted motion vector information and discrete cosign transform coefficient information whether one of the scene cuts has occurred.

In an alternative embodiment, analyzing is performed by parsing the compressed bitstream into blocks of video information and associated motion vector information for each field or frame of video information which comprises the determined sequence of fields or frames of video information representative of the scene, and estimating is executed by approximating any zoom and any pan of the camera by determining a multi-parameter transform model applied to the parsed motion vector information. In an especially preferred process, the frame difference due to camera pan and zoom motion may be modeled by a six-parameter affine transform which represents the global motion information representative of the zoom and pan of the camera.

The detecting step advantageously provides for computing local object motion for one or more moving video objects based on the global motion information and on one or more motion vectors which correspond to the one or more moving video objects. In addition, thresholding and morphological operations are preferably applied to the determined local object motion values to eliminate any erroneously sensed moving objects. Further, border points of the detected moving objects are determined to generate a bounding box for the detected moving object.

The present invention also provides for an apparatus for detecting moving video objects in a compressed digital bitstream which represents a sequence of fields or frames of video information for one or more previously captured scenes of video. Usefully, the apparatus includes means for analyzing the compressed bitstream to locate scene cuts therein and to determine at least one sequence of fields or frames of video information which represents a single video scene, means for estimating one or more operating parameters for a camera which initially viewed the video scene by analyzing a portion of the compressed bitstream which corresponds to the video scene, and means for detecting one or more moving video objects represented in the compressed bitstream by applying global motion compensation to the estimated operating parameters.

A different aspect of the present invention provides techniques for dissolving an incoming scene of video information which comprises a sequence of fields or frame of compressed video information to an outgoing scene of video information which comprises a sequence of fields or frame of compressed video information. This technique advantageously provides for applying DCT domain motion compensation to obtain DCT coefficients for all blocks of video information which make up a last frame of the outgoing video scene and the first frame of the incoming video scene, and for creating a frame in the dissolve region frame from the DCT coefficients of the last outgoing frame and the first incoming frame.

In an especially preferred arrangement, an initial value for a weighting function is selected prior to the creation of a first frame in the dissolve region and is used in the creation of the first frame in the dissolve region. The weighting value is then incremented, and a second dissolve frame from the DCT coefficients is generated.

In yet another aspect of the present invention, a technique for masking a compressed frame of digital video information is provided. The technique first determines whether the frame to be masked is intra-coded, predictive-coded or bi-directionally predictive-coded. If the frame is intra-coded, the technique provides for extracting DCT coefficients for all blocks within the frame, examining a block$_n$ to determine where in the frame the block is located, setting DCT coefficients for the block to zero if the block is outside the mask region, and applying a DCT cropping algorithm to the DCT coefficients if the block is on the boundary of the mask region.

If the frame is predictive-coded or bi-directionally predictive-coded, the technique provides for examining motion vectors associated with block$_n$ to determine whether they point to blocks outside or on the mask region, and reencoding the block if a motion vector points to blocks outside the boundary, or on, the mask region.

In still another aspect of the present invention, a technique for generating a frozen frame of video information from a sequence of frames of compressed video information is provided. The technique attractively provides for selecting a frame of compressed video information to be frozen, determining whether the frame to be frozen is intra-coded, predictive-coded or bi-directionally predictive-coded, and if the frame is not intra-coded, converting it to become intra-coded, creating duplicate predictive-coded frames, and arranging the intra-coded frame and the duplicate predictive-coded frames into a sequence of compressed frames of video information.

In yet a further aspect of the present invention, a system for editing compressed video information over a distributed network is provided. The system includes a client computer, a network link for permitting said client computer to search for and locate compressed video information on said distributed network, and tools for editing a compressed bitstream of video information over the distributed network.

The accompanying drawings, which are incorporated and constitute part of this disclosure, illustrate a preferred embodiment of the invention and serve to explain the principles of the invention.

DESCRIPTION OF THE PREFERRED EMBODIMENTS

Figure 1:
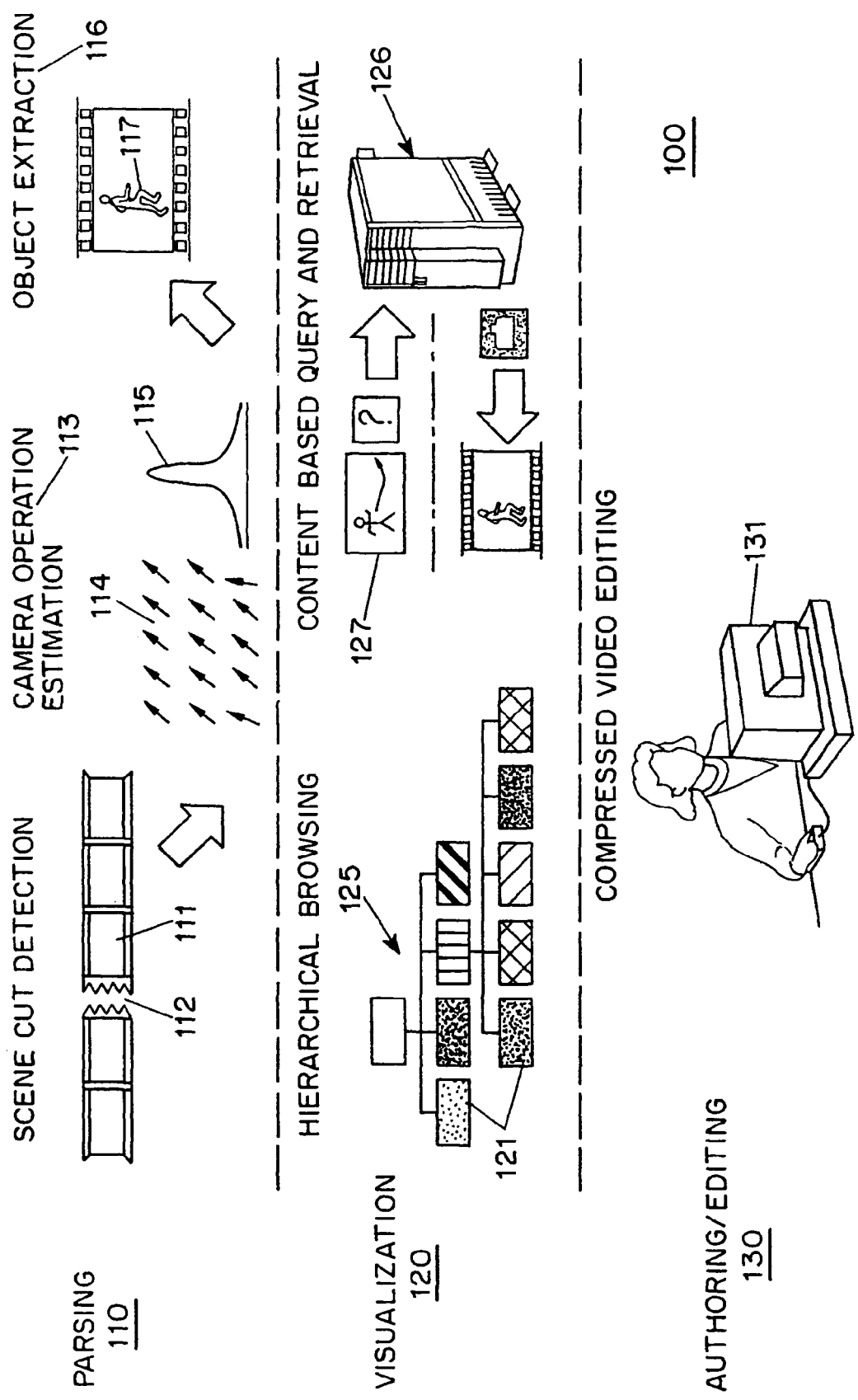
FIG. 1 illustrates a system in accordance with one aspect of the present invention.

Referring to FIG. 1, an exemplary embodiment of our invention which permits a user to edit and parse visual information in the compressed domain is provided. The architecture of the system 100 is broadly arranged into three functional modules, a parsing module 110, a visualization module 120, and an authoring and editing module 130.

In the parsing module, an incoming bitstream of compressed video information 111 which may be, for example, an MPEG-2 compressed bitstream is examined for scene cuts 112 and broken into shot segments, where each segment includes one or more fields or frames of compressed video information. In an MPEG-2 bitstream, the shot segments will be made of three types of fields or frames, i.e., Intra-coded ("I") fields which are coded independently and entirely without reference to other fields, Predictive-coded ("P") fields which are coded with reference to temporally preceding I or P fields in the sequence, and Bi-directionally predictive-coded ("B") fields which are coded with reference to the nearest preceding and/or future I or P fields in the sequence. The bitstream will also include associated motion vector information for the P and B fields which "point" to blocks of video information in a preceding or succeeding field or frame which are needed to reconstruct the compressed field or frame of video information.

The parsing module compiles a list of scene cuts which are useful for indexing the compressed video information. The individual shot segments are next analyzed 113 in order to derive camera operation parameters. In FIG. 1, the vector field 114 is representative of the pan of the camera which originally captured the video information which is being analyzed. Histogram 115 is used to detect the pan of the camera. Based on the derived operating parameters, moving objects 117 within the compressed video information 116 are detected and shape and trajectory features for such moving objects are extracted.

In the visualization module 120, the complied list of scene cuts and the derived camera zoom and pan information are used to extract key frames 121 which represent each video shot. The key frames 121 are placed in a hierarchical arrangement 125 so that they may be readily browsed with a hierarchical video scene browser, such as the browser described in D. Zhong et al., "Clustering Methods for Video Browsing and Annotation," Storage and Retrieval for Still Image and Video Databases IV, IS&T/SPIE's Electronic Images: Science & Tech. 96, Vol 2670 (1996). A content-based image query system 126 may then be used to index and retrieve key frames or video objects based on their visual features and spatial layout.

In the authoring and editing module 130, software tools are provided to not only enable a user to cut and past arbitrary compressed video segments to form new video segments, but also to add special effects to such video segments, such as dissolve, key, masking and motion effects.

Figure 2:
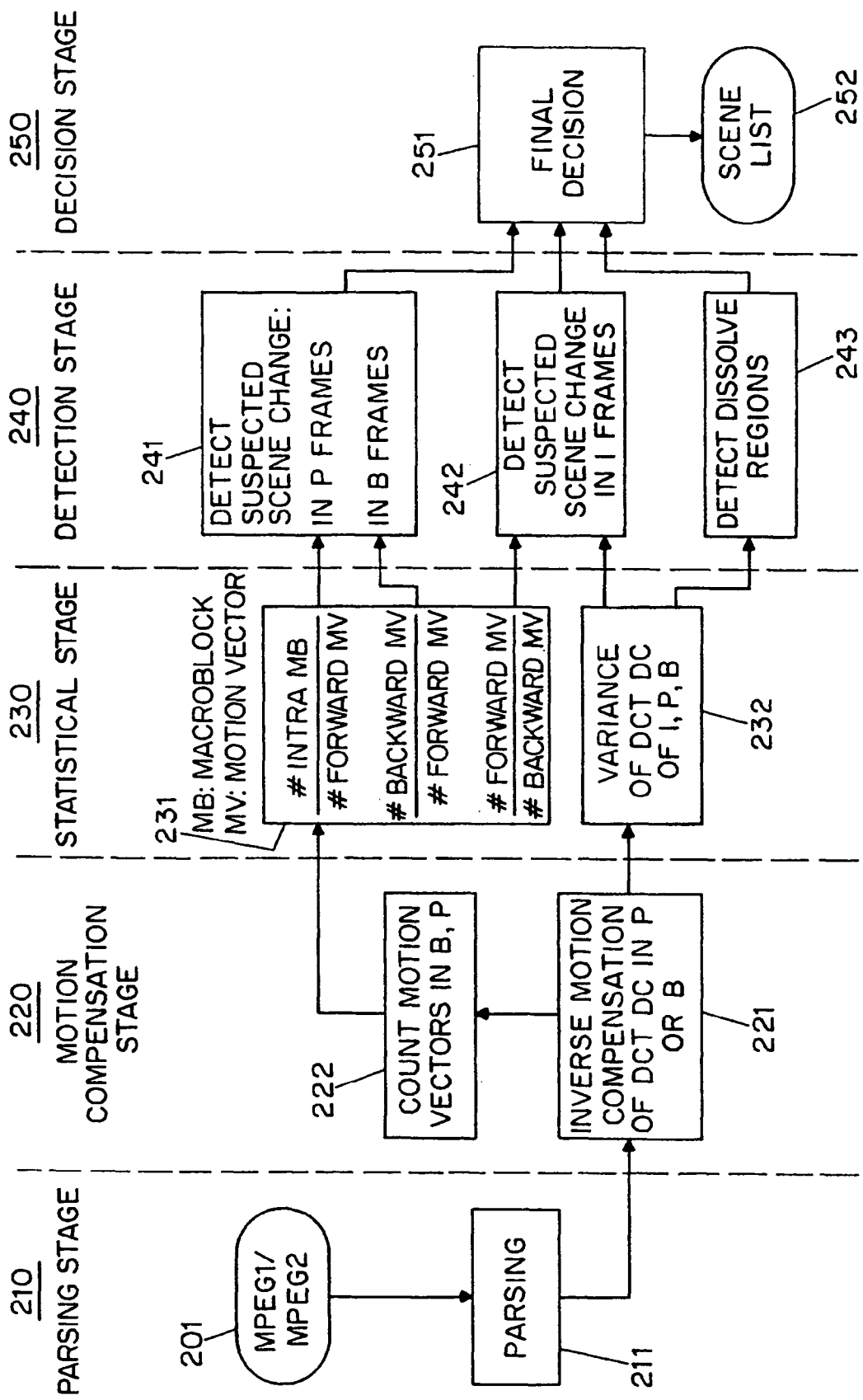
FIG. 2. is a flowchart which illustrates how a scene cut is detected in accordance with one aspect of the present invention.

The parsing module 110 is explained in further detail with reference to the FIGS. 2 and 3. Although the preferred steps executed e.g. on a computer 131 to locate scene cuts in a compressed bitstream are fully disclosed in the above referenced article by Meng et al., the disclosure of which is incorporated by reference herein, that technique is now described with reference to FIG. 2.

An MPEG-1 or MPEG-2 compressed bitstream 201 that is received by the parsing module 110 is first subjected to parsing 210. Such a bitstream represents an arrangement of N×N blocks of video information that are broadly organized into macroblocks, where each macroblock is defined by four blocks of luminance information and one block of chrominance information, and further organized into slices which represent contiguous sequences of macroblocks of video information in raster scan order. The N×N blocks of video information are preferably 8×8 blocks. The bitstream also represents associated motion vector information and prediction error difference information which are needed to reconstruct original blocks of video information.

In the parsing stage 210, the bitstream, is parsed down to the fundamental block level by parsing techniques known to those skilled in the art 211. The parsed blocks of video information are still in compressed format and are thus represented by Direct Cosign Trasform ("DCT") coefficients which have been quantized, Zig-Zag run-length encoded and variable length coded, as those skilled in the art will appreciate.

In the inverse motion compensation stage 220, the parsed blocks of video information which belong to P and B frames are then subjected to inverse motion compensation 220 by using the associated motion vector information to locate reference blocks of video information and reconstruct the DCT coefficients of blocks of video information in the B and P frames. In this step 220, only the first (the "DC") DCT coefficients are used. Motion vectors associated with the B and P frames are counted 222 for each frame in the sequence.

In the Statistical Stage 230, three ratios, i.e., the number of intra-coded macroblocks to the number of forward motion vectors, the number of backward motion vectors to the number of forward motion vectors, and the number of forward motion vectors to the number of backward motion vectors, are calculated 231 in order to detecting direct scene cuts in P, B, and I frames, respectively. In this stage, the fact that most video shots of compressed MPEG video are formed by consecutive P, I and B frames that have a high degree of temporal correlation is taken advantage of. For P and B frames, this correlation is characterized by the ratio of the number of backward motion vectors, or intracoded macroblocks, to the number of forward motion vectors. For example, when a direct scene cut occurs on a P-frame, most macroblocks will be intracoded (i.e., no interframe prediction).

Also in the statistical stage 230 the variance of the DCT DC coefficients of Luminance in the I, P and B frames is determined 232. As those skilled in the art will appreciate.

Next, in the detection stage 240, the ratios calculated in 231 are compared to local adaptive thresholds in order to detect the peak values 241. For P frames, the ratio of the number of intra-coded macroblocks to the number of forward motion vectors is examined. For B frames, the ratio of the number of backward motion vectors to the number of forward motion vectors is examined.

Also in the detection stage 240, the variance of DCT DC coefficients calculated for I and P frames in 232 is used in two ways. For I frames, this variance information is used together with the ratio of the number of forward motion vectors to the number of backward motion vectors determined in 231 in order to detect candidate scene changes 242. If the ratio is above a predetermined threshold, the frame is marked as containing a suspected scene cut. If the variable information is much different than was the variance information for the immediately preceding I frame, a suspected scene cut is likewise detectable. The variance information is also used directly to detect dissolve regions, i.e. regions where one scene is fading out and a second is fading in 243 by examining the parabolic curve of the variance information.

In the decision stage 250, duplicate detections of scene cuts are eliminated 251 before list of scenes 252 is determined. In addition, if a suspected scene change occurs within a time threshold T rejection of a previously detected scene change, no scene change is recorded.

With scene cuts detected, the bitstream is broken into scenes or "shots" which represent different sets of visual information that may be of interest to a user. The next block of our parsing module 110, camera operating estimation 113, examines the individual shots for recognizable information which is highly useful in indexing the different shots which have been parsed.

In particular, certain low level visual features such as camera zoom and pan, and the presence of moving visual objects are useful information for video indexing. Camera zoom and pan, which give the global motion of the shot being analyzed, can be estimated with a 6-parameter affine transform model by using the actual motion vectors from the MPEG compressed stream.

The motion vectors in MPEG are usually generated by block matching: finding a block in the reference frame so that the mean square error of prediction is minimized. Although the motion vectors do not represent the true optical flow, it is still good in most cases to estimate the camera parameters in sequences that do not contain large dark or uniform regions.

When the distance between the object or background and the camera is large, a 6 parameter affine transform can be used to describe the global motion of the current frame:

$$\begin{bmatrix} u \\ v \end{bmatrix} = \begin{bmatrix} 1 & x & y & 0 & 0 & 0 \\ 0 & 0 & 0 & 1 & x & y \end{bmatrix} \cdot [a_1 \ a_2 \ a_3 \ a_4 \ a_5 \ a_6]^T \quad (1)$$

where (x, y) is the coordinate of a macroblock in the current frame, $[u \ v]^T$ is the motion vector associated with that macroblock, and $[a_1 \ a_2 \ a_3 \ a_4 \ a_5 \ a_6]^T$ is the affine transform vector. In order to simplify the mathematics, the following variables can be defined:

U for $[u, v]^T$

X for $$\begin{bmatrix} 1 & x & y & 0 & 0 & 0 \\ 0 & 0 & 0 & 1 & x & y \end{bmatrix},$$

and $\hat{a}$ for $[a_1 \ a_2 \ a_3 \ a_4 \ a_5 \ a_6]^T$.

Given the motion vector for each macroblock, a global parameter can be determined using Least Squares ("LS") estimation by finding a set of parameters to âminimize the error between the motion vectors estimated in (1) and the actual motion vectors obtained from the MPEG stream:

$$S(\vec{a}) = \sum_X \sum_Y [(\hat{u}_{xy} - u_{xy})^2 + (\hat{v}_{xy} - v_{xy})^2] \quad (2)$$

In equation (2), $[\hat{u}, \hat{v}]^T$ is the estimated motion vector. â is then solved for by setting the first derivative of S â to 0 to get:

$$\begin{bmatrix} N & A & B \\ A & C & E \\ B & E & D \end{bmatrix} \cdot \begin{bmatrix} a_1 \\ a_2 \\ a_3 \end{bmatrix} = \begin{bmatrix} U_1 \\ U_2 \\ U_3 \end{bmatrix} \text{ and } \begin{bmatrix} N & A & B \\ A & C & E \\ B & E & D \end{bmatrix} \cdot \begin{bmatrix} a_4 \\ a_5 \\ a_6 \end{bmatrix} = \begin{bmatrix} V_1 \\ V_2 \\ V_3 \end{bmatrix} \quad (3)$$

where, $$N = \sum_x \sum_y 1, \ A = \sum_x \sum_y x, \ B = \sum_x \sum_y y,$$

$$C = \sum_x \sum_y x^2, \ D = \sum_x \sum_y y^2, \ E = \sum_x \sum_y x \cdot y,$$

$$U_1 = \sum_x \sum_y u_{xy}, \ U_2 = \sum_x \sum_y u_{xy} \cdot x, \ U_3 = \sum_x \sum_y u_{xy} \cdot y,$$

$$V_1 = \sum_x \sum_y v_{xy}, \ V_2 = \sum_x \sum_y v_{xy} \cdot x, \ V_3 = \sum_x \sum_y v_{xy} \cdot y.$$

All summations are computed over all valid macroblocks whose motion vectors survive after the nonlinear noise reduction process. (For example, median filter.) This process is used to eliminate obvious noise in the motion vector field. After the first LS estimation, motion vectors that have large distance from the estimated ones are filtered out before a second LS estimation. The estimation process is preferably iterated several times to refine the accuracy.

Figure 3:
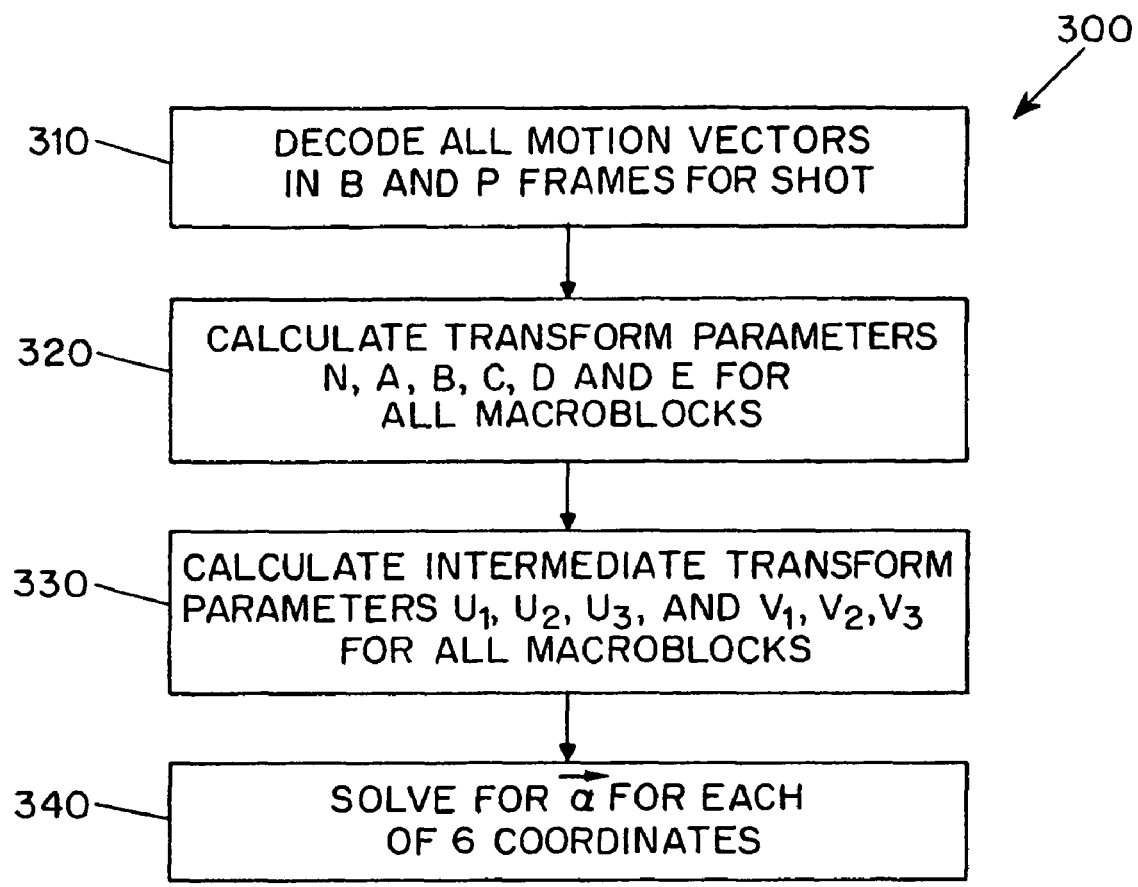
FIG. 3. is a flowchart which illustrates how camera parameters are estimated in accordance with one aspect of the present invention.

Referring to FIG. 3, the foregoing process to determine a global motion parameter is illustrated in flow diagram 300. In step 310, each motion vector associated with the B and P frames contained in the shot are decoded. The intermediate variables N, A, B, C, D, and E are interactively calculated using the x and y coordinates for each macroblock in the current frame of video being analyzed 320. Next, intermediate transform parameters $u_1$, $u_2$, $u_3$, $v_1$, $v_2$, $v_3$ are calculated using the decoded motion vectors and the x and y coordinates for such macroblocks 330. Finally, the vector â is solved for by solving for the matrix inverse operation 340.

Figure 4:
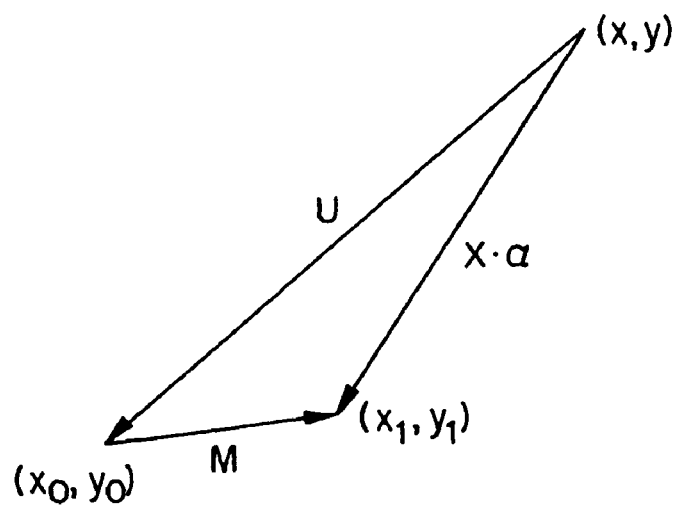
FIG. 4 is a vector diagram which serves to explain global and local motion.

After the global camera parameters â are found, object motion can be extracted by applying global motion compensation. Referring to FIG. 4, if an object located at (x, y) in the current frame moves from $(x_0, y_0)$ to $(x_1, y_1)$ in the reference frame with motion vector U, then U+M=X·â. Thus, the motion of the local object can be recovered from its associated motion vectors as follows:

$$M = X \cdot \hat{a} - U \quad (4)$$

Figure 5A:
FIG. 5 depicts an exemplary frame of compressed video information and motion vectors for the frame.
Figure 5B:
Figure 5C:
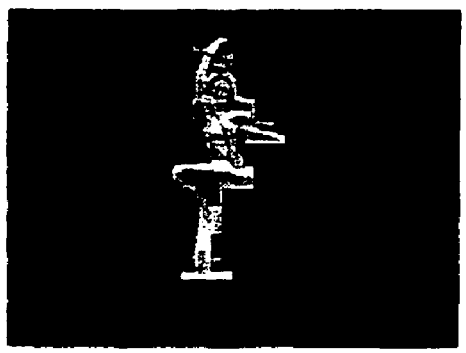

This is referred to as the global motion compensation ("GMC"). With reference to FIG. 5, a moving ballerina is shown against a largely stagnant background. In FIG. 5(a), the original motion vectors for an exemplary frame of compressed video is illustrated. In FIG. 5(b), the vector map for the exemplary frame is shown after GMC has been applied. As illustrated in FIG. 5(b), for motion vectors of the background, GMC gives mostly zero values, while for motion vectors of the foreground moving objects, GMC reveals the local motion of objects.

The moving objects themselves can be detected by comparing the magnitude of the local motion to a predetermined threshold value and by performing simple morphological operations to delete small false objects and to fill noisy spots. For example, in FIG. 5(c) there is shown an extracted moving object.

Figure 5D:

The DCT coefficients of the moving object are extracted from the compressed video information to provide for later querying of the object. Extraction of the DCT coefficient is done by the DCT domain motion compensation algorithm, as disclosed in U.S. Pat. No. 5,408,274 to Chang et al., the disclosure of which is incorporated by reference herein. The outermost points of the extracted object are used to form a bounding box, as illustrated in FIG. 5(d).

Again referring to FIG. 1, in the visualization module 120, the location and size of each extracted bounding box is saved in a database 126 for later browsing and indexing by a user. Likewise, visual features of extracted objects, such as color, textures, and shape, are used to provide content-based visual querying 127 of these and associated video scenes.

Figure 6:
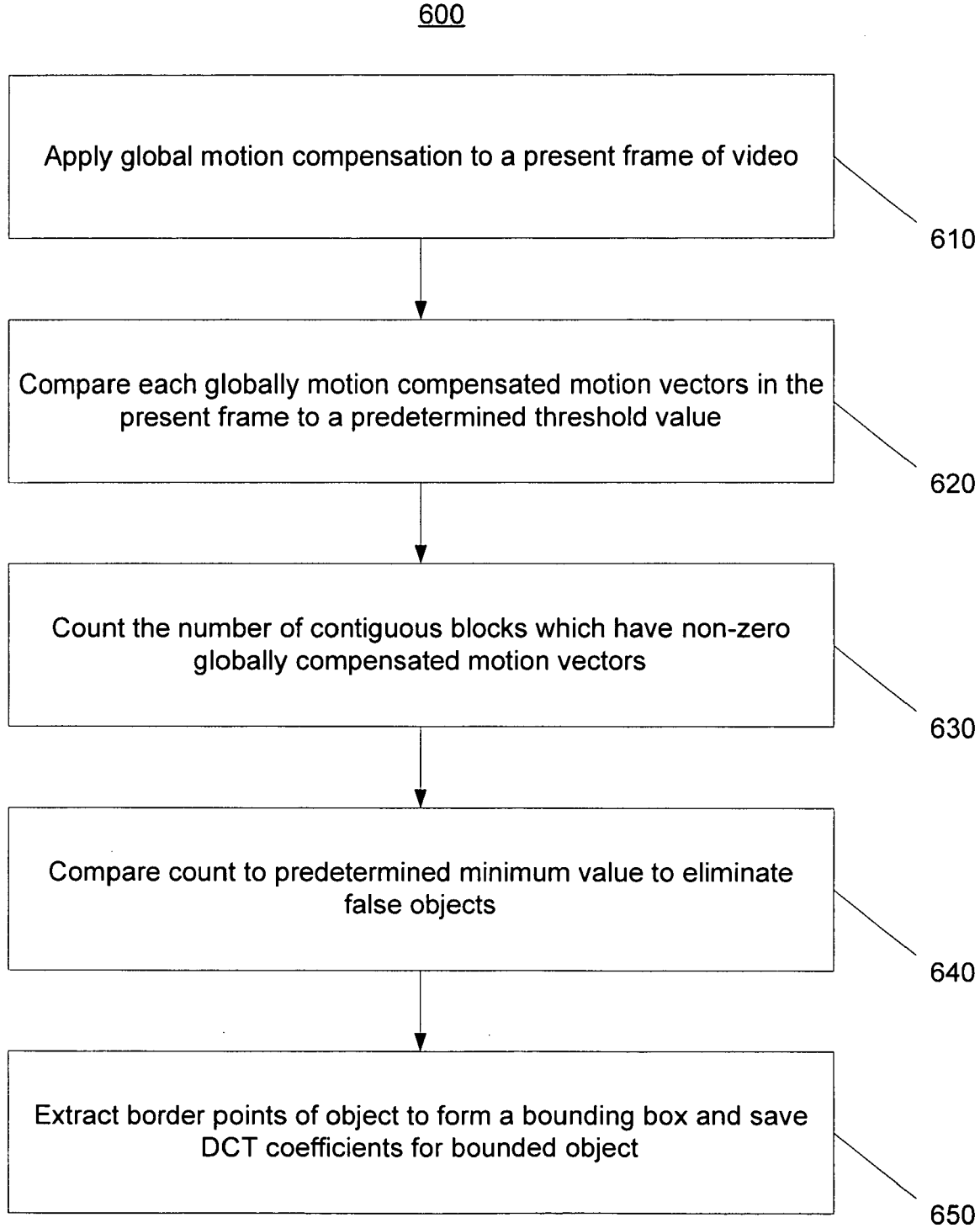
FIG. 6 is a flowchart which illustrates global motion compensation in accordance with one aspect of the present invention.

The extraction of moving video objects from a compressed bitstream will now be described with reference to the flow diagram 600 of FIG. 6. First, GMC is applied to the present frame of video 610. Second, each globally motion compensated motion vector is compared to a predetermined threshold value 620 in order to eliminate non-moving parts of the frame from further consideration. Next, for blocks of information which still have non-zero motion vectors, the number of contiguous blocks are counted 630. For each contiguous area, the number of associated blocks are compared to a predetermined minimum threshold value 640 in order to eliminate false small objects from being detected. Finally, the border points for the remaining objects are identified and saved in a database, e.g. database 126, for later use 650, together with corresponding DCT coefficients for all blocks within the border. In this way, the important moving video object can be extracted and indexed for later viewing by a user.

Figure 7:
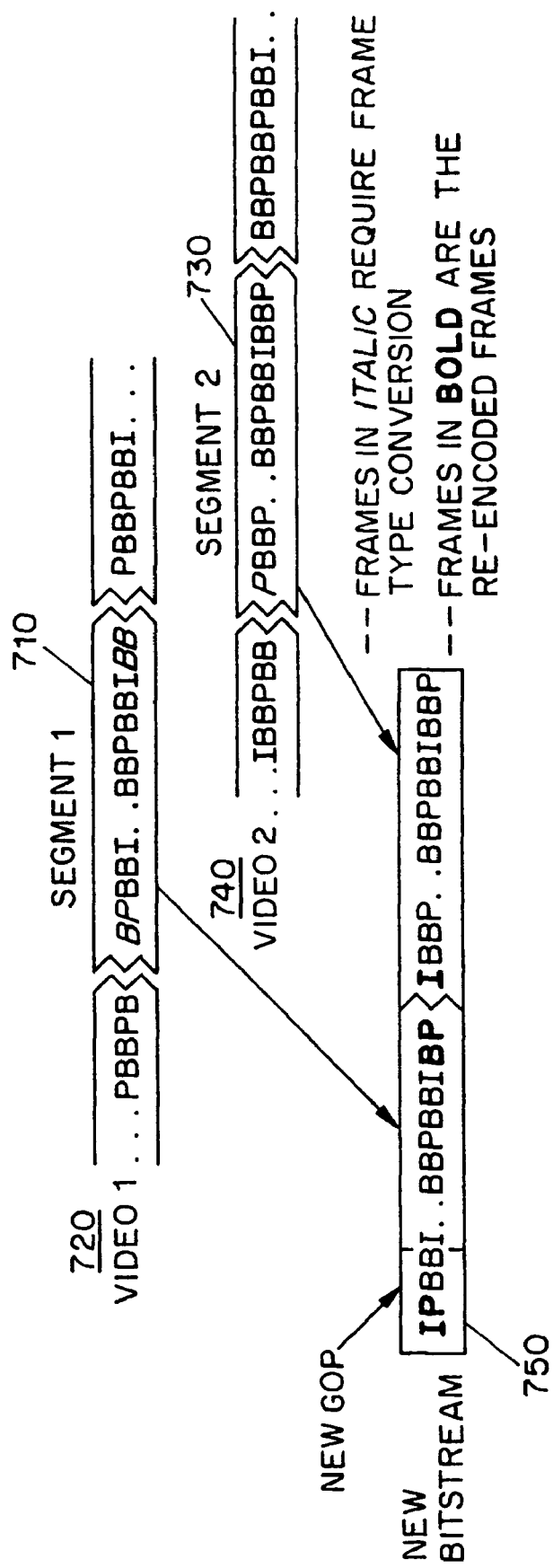
FIG. 7 depicts prior art editing of compressed video bitstreams.

With reference to FIG. 7, useful techniques for directly editing compressed digital video will now be described. In general, editing of compressed video is directed to permitting a user to cut a first segment of video 710 from a first video sequence 720 and a second segment of video 730 from a second sequence of video 740 to form a new bitstream of video information 750. Such techniques have been described in the art, including in the article by the present inventors, J. Meng et al., "Tools for Compressed-Domain Vide Indexing and Editing," SPIE Conf. on Storage and Retrieval for Image and Video Database, Vol. 2670 (1996), the disclosure of which is incorporated by reference herein.

In addition to the basic editing function "cut and paste", several more advanced visual effects can be created in the compressed domain. For I frames, the basic compression component is the Discrete Cosine Transform (DCT), which can be written in the following form:

$$F(u,v)=DCT(f(x,y)) \quad (5)$$

Given the DCT, linear operations such as intensity addition and scaling can performed in accordance with equations (6) and (7):

$$DCT(f_1(x,y)+f_2(x,y))=F_1(u,v)+F_2(u,v) \quad (6)$$

$$DCT(\alpha \cdot f(x,y))=\alpha \cdot F(u,v) \quad (7)$$

Algorithms for other operations such as spatial scaling, translation, and filtering in DCT domain are well known in the art. Generally, the DCT of the output video Y can be obtained by linear matrix operations of the input DCT, $P_i$, as follows:

$$Y = \sum_i W_i \cdot P_i \cdot H_i \quad (8)$$

where $H_i$ and $W_i$ are special filter coefficient matrices in the DCT domain. For motion compensated B and P frames, the compressed-domain manipulation functions can be implemented in two ways. First, transform-domain techniques can be used to convert B and P frames to intraframe DCT coefficients, on which the above techniques can be readily applied. An alternative approach is to keep the B or P structure (i.e., the DCT coefficients of residual errors and motion vectors) and develop algorithms directly utilizing these data. Several advanced visual effects which can be created in the compressed domain—dissolve, masking, freeze frame, variable speed, and strobe motion—are now particularly described.

Figure 8A:
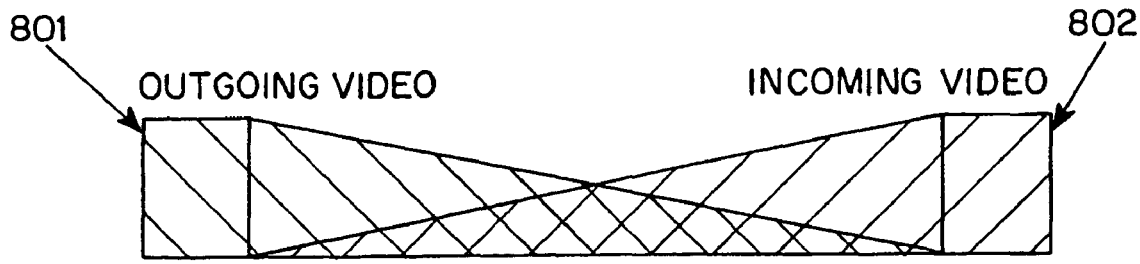
FIG. 8a depicts the dissolve effect.

One of the most important tools used in film editing is dissolve. As illustrated in FIG. 8(a), dissolve refers to the technique where an outgoing video scene 801 is faded out while an incoming video scene 802 is faded in. In order to perform a dissolve on two different scenes of video, the actual DCT coefficients for each block of compressed video in the last frame of the outgoing video scene, and the DCT coefficients for each block of compressed video in the first frame of the incoming video scene, must be extracted. One technique for extracting such DCT coefficients is described in the above-mentioned Chang et al. patent. The Chang et al. patent describes a technique which uses DCT domain inverse motion compensation to obtain the DCT coefficients for all blocks of video information which make up the needed frames of video.

When there is no or little motion in the two videos scenes, the dissolve effects can be approximated by the linear combination of the two video scenes $F_1$ and $F_2$:

$$F(u,v,t)=\alpha(t)\cdot F_1(u,v,t_1)+(1-\alpha(t))\cdot F_2(u,v,t_2) \quad (9)$$

v and v are coordinates within a frame, t is the frame index value which may range from 1 to N, n being the total number of frames in the dissolved region, and $\alpha(t)$ is a weighing function that is variable from 100% to 0%, $F_1$ is the composite of the derived DCT coefficients for all blocks which make up the last frame of the outgoing video scene and $F_2$ is the composite of the derived DCT coefficients for all blocks which make up the first frame of the incoming video scene. The resulting effect is a dissolve transition from a particular frozen frame of the outgoing video scene to another frozen frame of the incoming video scene.

Thus, to smooth out the dissolve where one or both of the dissolving scenes contain moving video objects, it is desirable to re-encode several dissolving frames over a transitional period $t_1$-$t_2$. The reader is referred to the Appendix of this patent document for our preferred source code for implementing a dissolve.

Figure 8B:
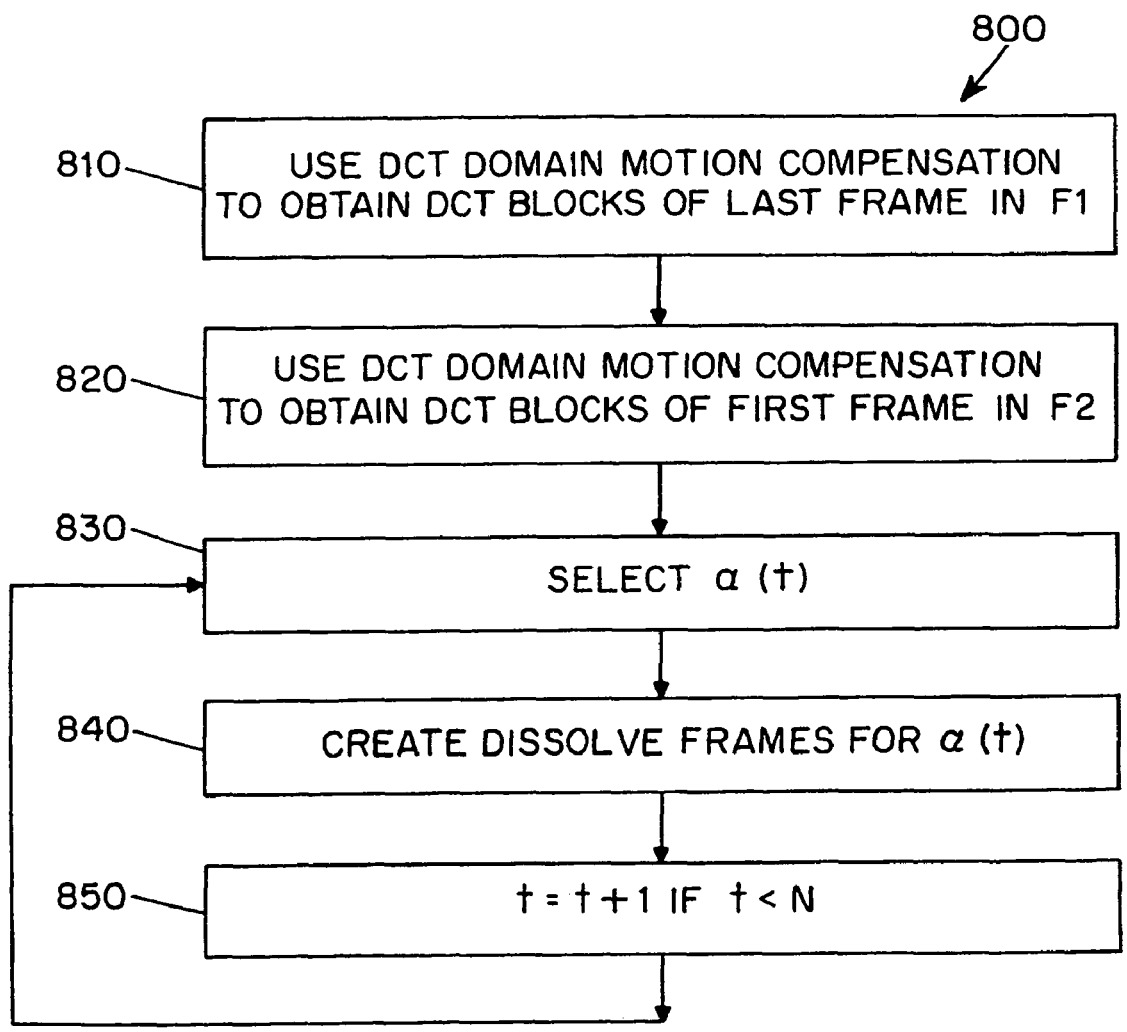
FIG. 8(b) is a flowchart which illustrates the dissolve effect.

Referring to FIG. 8(b), a method for dissolving an incoming scene and an outgoing scene of video is now described by way of a flowchart 800. In step 810, DCT domain motion compensation is used to obtain the DCT coefficients for all blocks of video information which make up the last frame of an outgoing video scene $F_1$. In step 820, DCT domain motion compensation is used to obtain the DCT coefficients for all blocks of video information which make up the first frame of an incoming video scene $F_2$. In step 830, the initial value for the weighing function, $\alpha(t)$, is chosen. In step 840, equation 9 is applied to create a first frame in the dissolve region. The value of t is then incremented until a final value n is obtained 850. The process 830-850 is repeated to create all dissolve frames for the duration t=1 to n.

Figure 9A:
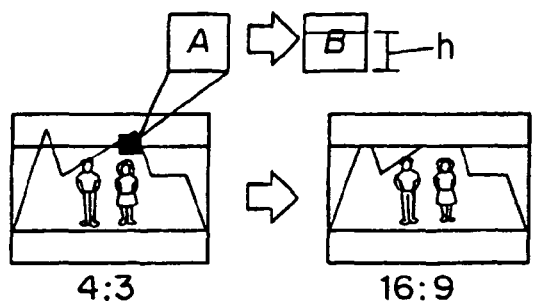
FIG. 9a depicts masking.

A second important tool used in film editing is masking. As illustrated in FIG. 9(a), the film effect of masking video refers to transforming an original video scene having e.g. a 4:3 aspect ratio to different aspect ratios such as 1:1.66, 1:1.85, 1:2.35, or 16:9. Masking can also be used to crop part of the frame region to a different frame size. For I frames, the DCT coefficients for blocks outside of the desired region are set to 0, and the coefficients for blocks that lie on the masking boundaries can recalculated using a simplified DCT cropping algorithm:

$$DCT(B) = DCT(H) \cdot DCT(A), \quad (10)$$

$$\text{where } H = \begin{bmatrix} 0 & 0 \\ 0 & I_h \end{bmatrix}$$

where A is an original block located on the boundary, B is the new masked block, and $I_h$ is the identity matrix with size h×h, as shown in FIG. 9a.

For P and B frames, only macroblocks with motion vectors pointing outside of the masking region need to be re-encoded. Macroblocks with motion vectors pointing inside do not need any modification. Efficient algorithms for reencoding macroblocks are well known in the art and are described in, for example, the above-referenced Chang et al. patent.

Figure 9B:
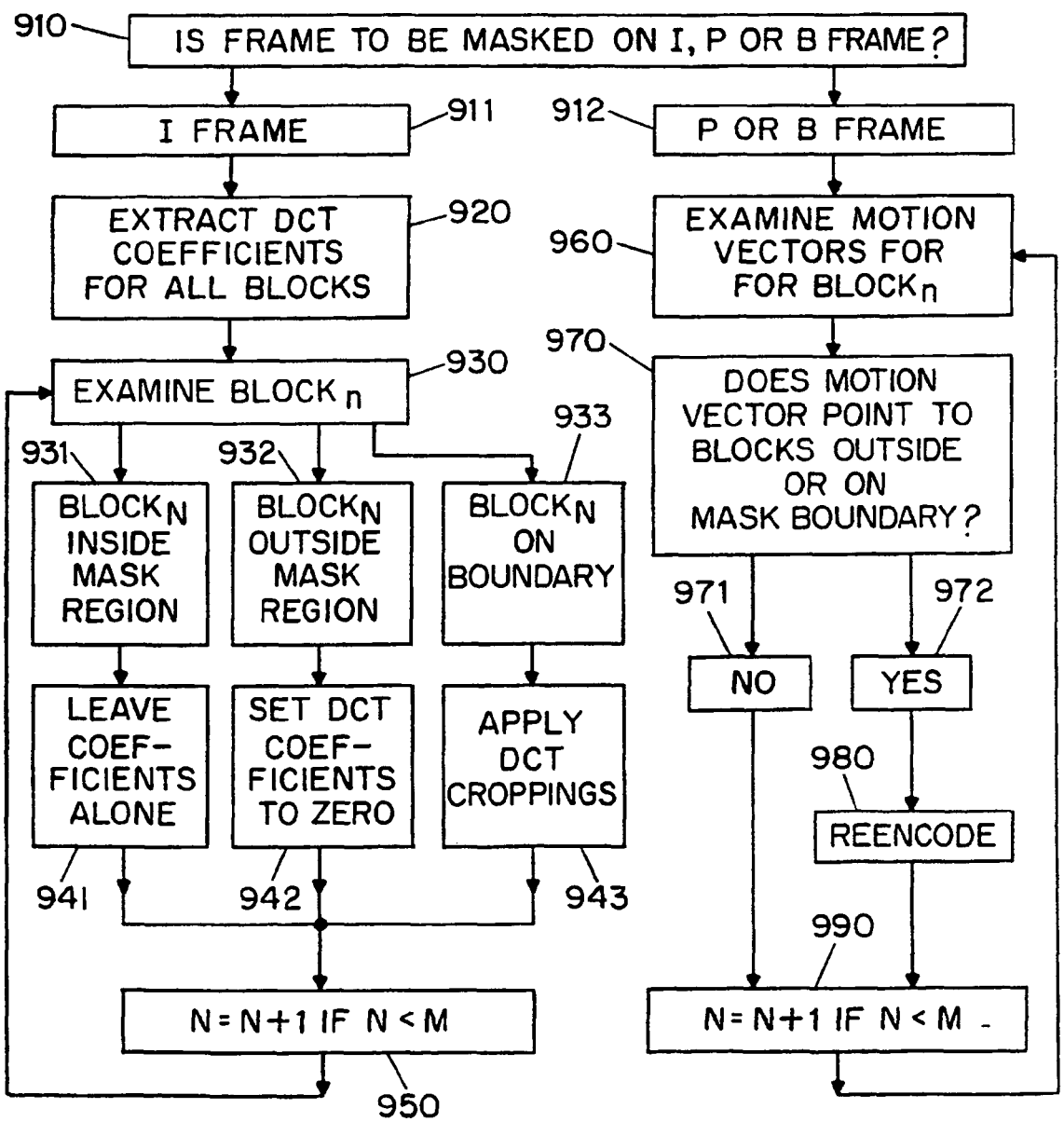
FIG. 9(b) is a flowchart which illustrates masking.

Referring to FIG. 9(b), a method for performing masking is now described. In step 910, the frame to be masked is examined in order to determine whether it is an I, P or B frame. If the frame is an I frame 911, all DCT coefficients for all blocks within the frame are extracted 920. Block$_n$ is examined 930 to determine where in the frame it is located. If the block is inside the mask region 931, the DCT coefficients for the block are unchanged 941. If the block is outside the make region 932, the DCT coefficients for the block are set to zero 942. If the block is on the boundary of the masked region 933, the DCT cropping algorithm, i.e., equation 10, is applied 943. The block index n is incremented 950 and the process repeated 930-950 until all blocks have been examined.

If, however, the frame to be masked is either a P or B frame 920, motion vectors associated with block$_n$ are examined 960 to determine whether they point to blocks outside or on the mask region 970. If a motion vector points to blocks outside or on the mask region 972, the macroblock is reencoded 980. The block index n is incremented 990 and the process repeated 960-990 until all blocks have been examined.

A third important tool used in film editing is the freeze effect. Since the freeze effect is usually longer than 1 second, simply repeating duplicate frames is not desirable if interactive playback (e.g. random search) is desired. Instead, the film effect of freeze frame requires the use of periodic I frames.

Thus, in order to ensure interactive playback capabilities, if the frozen frame is a P or B frame, it should be converted to an I frame. In order to convert a P or B frame into an I frame, every block of video information for the frame that has an associated motion vector is converted into a pure array of DCT coefficients, without motion vector information. The above-mentioned DCT domain motion compensation algorithm described in the Chang et al. patent is advantageously used to effect such conversion. The converted blocks can be referred to as intracoded blocks. Thereafter, the group of pictures which represent the frozen frame are filled with duplicated P frames, with all macroblocks in the duplicated P frames being to Motion Compensation Not Coded (i.e., 0 motion vector, and 0 residue error). Duplicate P frames can easily be created independently and inserted after I or P frames, as those familiar with digital compression techniques will easily understand.

Figures 10, 11:
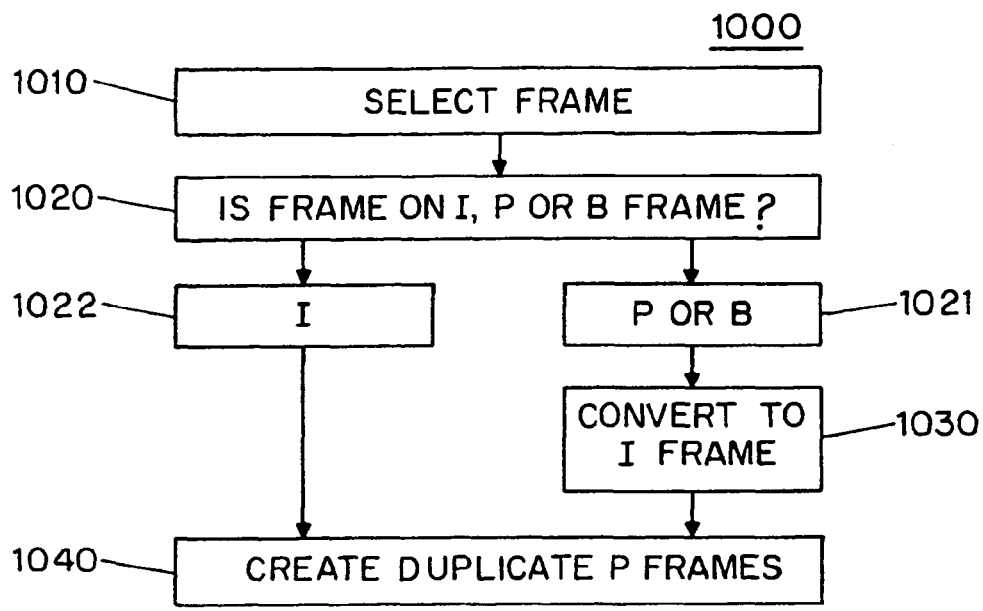
FIG. 10 is a flowchart which illustrates the freezeframe effect.
FIG. 11 depicts two alternative techniques for the slow motion effect.

A method for generating a frozen frame of video information is now described with reference to flowchart 1000 in FIG. 10. In step 1010, a user-defined frame of compressed video information is selected for the freeze-frame effect. In step 1020, the frame is examined in order to determine whether it is an I, P or B frame. If the frame is not an I frame 1021, it is converted into an I frame 1030. Finally, original 1022 or converted 1030 I frames are then used as to create duplicate P frames 1040. Periodical I frames can be inserted to increase interactivity, and to maintain a compatible bitrate.

A fourth important tool used in film editing is variable speed playback. Faster than normal playback, e.g., fast forward, is simply realized by dropping B, P, and then I frames according to the variable speed desired.

With respect to slow motion, depending on the slow motion rate, there are two possible approaches. With reference to FIG. 11, one approach is to simply insert duplicate B frames (B') whenever an original B frame appears. Duplicate B frames are frames which copy all DCT coefficient, and associated motion vectors from previous B frame. There is no decoding or re-encoding involved in this approach. However, this approach has a drawback since the I/P frame delay is increased by a factor equal to the inverse of the motion rate. For example, in the illustrative sequence of frames shown in FIG. 11, the reference frame $I_0$ must be transmitted 4 frames earlier. This limitation makes this approach suitable for slow playback up to about ½ normal frame rate. This will require an increased decoder buffer size.

In approach 2, original P/B frames are converted to I frames using the DCT domain techniques described above, and duplicated P frames are inserted between I frames, as in the case with freeze frame. This approach reduces frame delay, although requiring extra DCT domain manipulations.

Another interesting tool used in film editing is the special effect of strobe motion, which is simply a combination of freeze frame and variable speed playback. Strobe motion is effected by dropping original B and/or P frames and inserting duplicated P frames.

Figure 12:
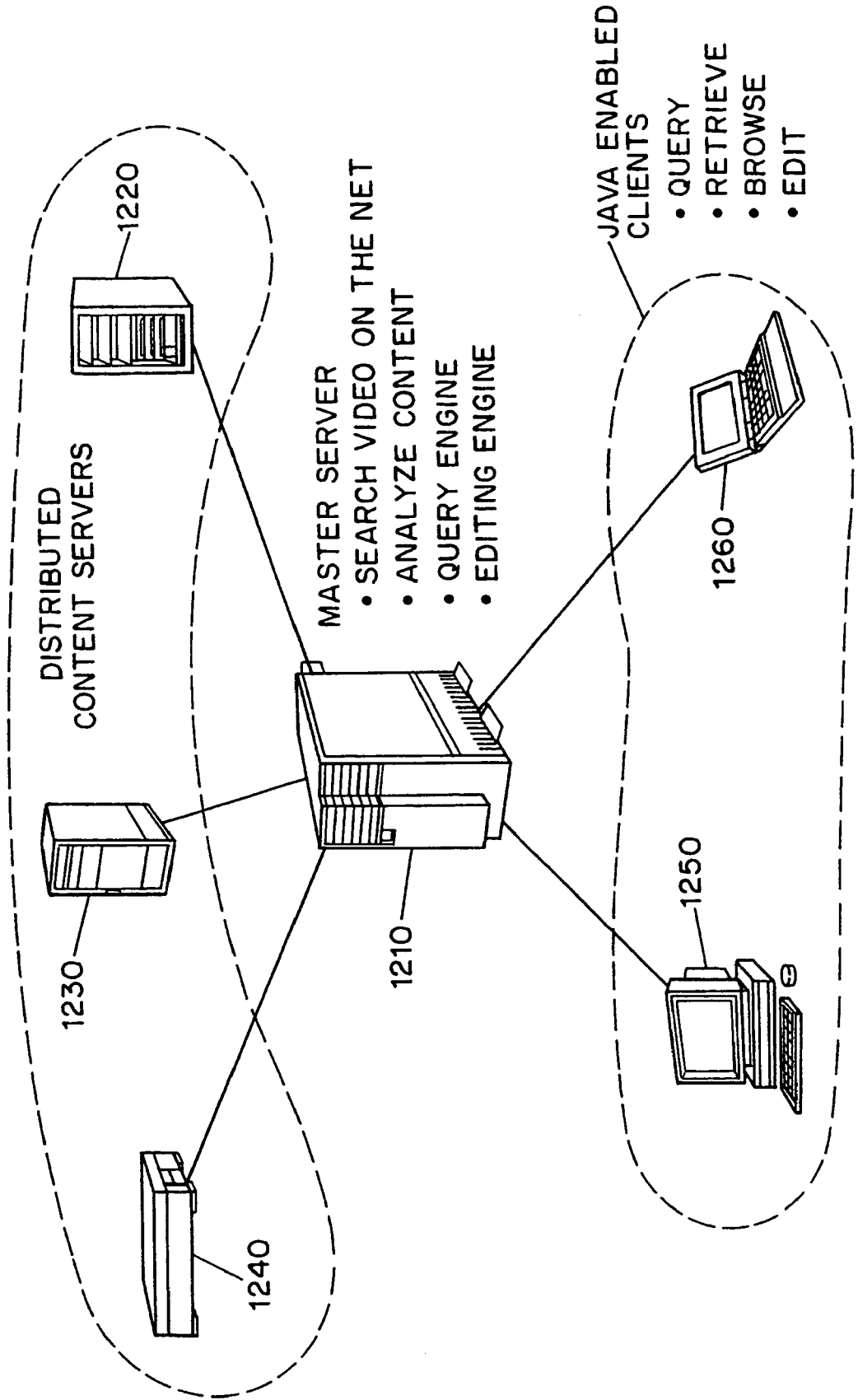
FIG. 12 is a system diagram of a distributed network in accordance with one aspect of the present invention.

Referring to FIG. 12, a system for enabling distributed clients to browse and manipulate digital video by way of a distant server or host computer is now described. A master server 1210 or a group of distributed servers is linked to distant servers 1220, 1230, 1240 and several clients 1250, 1260. From their client workstations, users are empowered to browse and edit compressed vide images in the manner described above.

Figure 13:
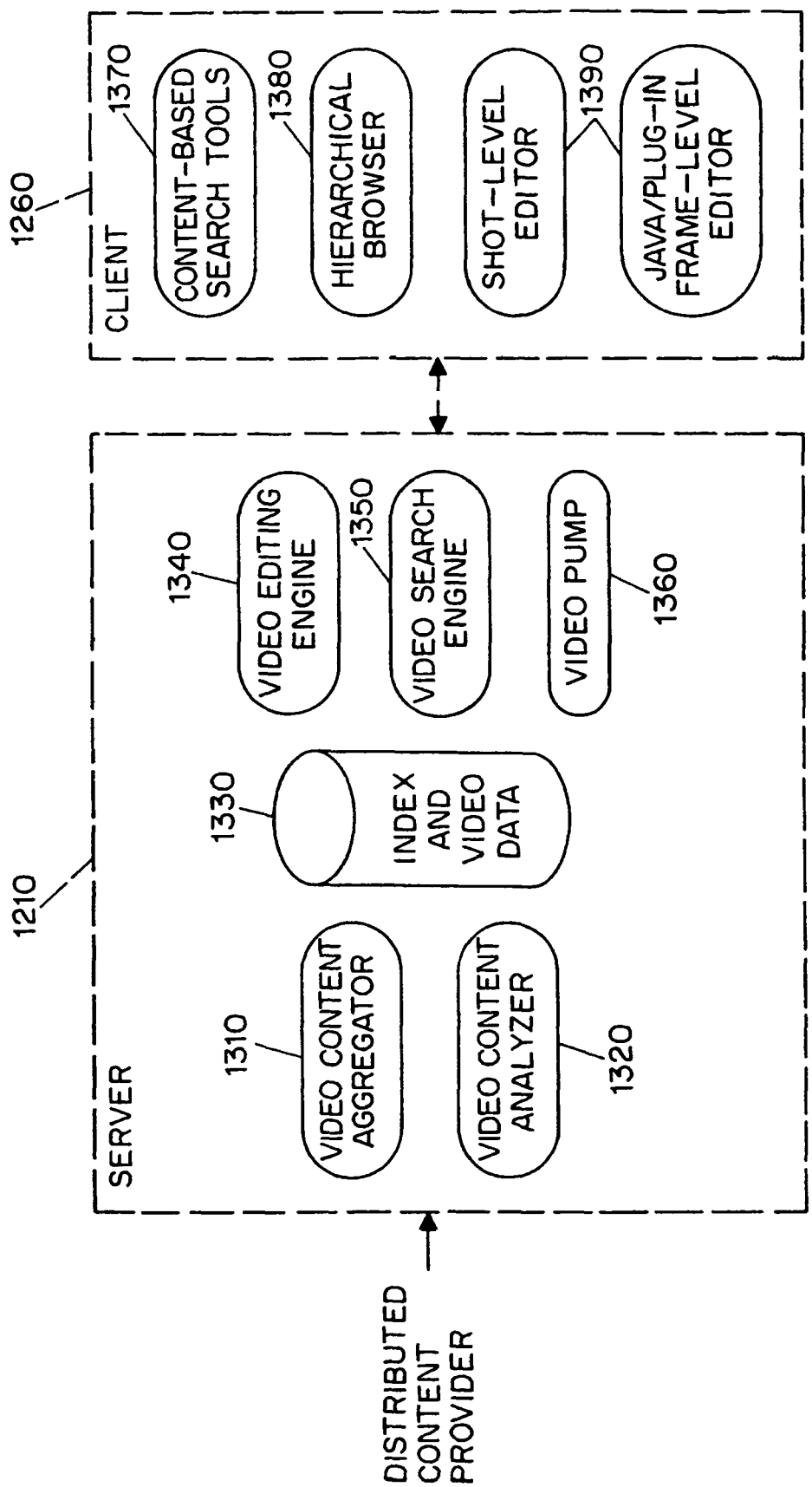
FIG. 13 depicts exemplarily techniques which may be executed in the distributed network illustrated in FIG. 12.

Moving to FIG. 13, the master server 1210 acts as the content aggregator 1310 to collect video content, and as a content analyzer 1320 to analyze the visual content for efficient indexing 1330. Thus, the server 1210 may accept the functions performed by the parsing module 110 described above. The server 1210 also provides an editing engine 1340 with basic editing tools, such as the tools described above, for rendering basic editing functions and various special effects. Distributed clients 1250, 1260 access the video archives of the server through heterogeneous networks with interoperable interfaces, such as JAVA or MPEG MSDL manipulation tools.

The video server 1210 can be linked with other distributed servers 1220, 1230, 1240 that have video search engines which search for image and video over a network, e.g., the World Wide Web. Once a video file is found on any other hosts or online content providers, it will be downloaded and preprocessed by the video server 1210 to extract "keyframes," i.e., frames 121 stored in the above described visualization module 120, and associated visual features such as camera motion, moving objects, color, texture, and temporal features. The Universal Resource Location ("URL") of the video and the extracted features will be stored on the video server 1210. This client-server model empowers clients 1250, 1260 with much richer resources beyond that provided by the client's local system.

The client 1260 may open any video shot stored at the server 1210 and browse 1330 the keyframes hierarchically using any one of numerous different viewing models, including sequential view, feature-based view, and story-based view. A sequential view arranges the video shots according to the sequential time order; a feature-based view clusters video shots with similar visual features to the same group; a story view presents video shots according to the story structures in the semantic level. For example, for news applications, the story model may use the anchorperson shot as the criterion for automatic segmentation of video into semantic-level stories. The client can also perform shot-level editing or frame level editing 1390 using the above discussed editing tools. The clients may also submit their own videos which may be analyzed and indexed by the server 1210.

To view or to further refine retrieved video shots, the client 1260 may choose different levels of resolution for the video shots sent by the server 1210. There are three broad levels of video rendering. At the first level, the client 1260 can render only straight cuts at low resolution without any special effects. At the second level, the client may send information to the server defining low-resolution video with desired special effects to be generated. Finally, when the client 1260 no longer wishes to perform editing, the master server 1210 will generate a full-resolution video with all the effects requested by the client from the highest quality source video which is located at either the master server 1210 or the distributed remote content servers 1220, 1230, 1240. In this way, the user is given the flexibility to tradeoff between quality and speed.

In order to obtain a reduced resolution video sequence, for each video sequence stored on a server, a low resolution icon stream video must be extracted from the full resolution video. The icon stream is an 8:1 down sampled version of the original video. For I frames, DCT DC coefficients are obtained directly. For B and P frames, DCT domain inverse motion compensation is applied to the DCT coefficients. Finally, the extracted coefficients are converted into a smaller sized, e.g., 8:2:1, I frame as those skilled in the art will appreciate.

The foregoing merely illustrates the principles of the invention. Various modifications and alterations to the described embodiments will be apparent to those skilled in the art in view of the inventors teachings herein. For example, while the above description was directed to indexing and editing digital vide which has been compressed in accordance with the MPEG format, the foregoing is equally applicable to other compressed bitstreams, e.g., Motion JPEG, H.261 or H.263, or any other algorithm based on transform coding and motion compensation. It will thus be appreciated that those skilled in the art will be able to devise numerous systems and methods which, although not explicitly shown or described herein, embody the principles of the invention and are thus within the spirit and scope of the invention.

Appendix

```
int do_dissolve(int duration)
{
    int i, j, k, s, cc;
    int blks;
    double alpha;
    short (*tmp[3])[64];
    ld = &S1;
    initbits( );
    ld->end = roundtoP(ld->end);
    do_cut(ld->begin, ld->end);
    getDCTframe(ld->end, GETDCT);
    /* copy the first DCT to tmpDCT */
    for (cc=0; cc<3; cc++) {
        if (cc==0)
            blks = (coded_picture_width*coded_picture_height)>>6;
        else
            blks = (chrom_width*chrom_height)>>6;
        memcpy(tmpDCT[cc], refDCT[cc], blks * sizeof(short [64]));
    }
    ld = &S2;
    initbits( );
    ld->begin = roundtoP(ld->begin);
    getDCTframe(ld->begin, GETDCT);
    /* first prediction is based on tmpDCT */
    for (cc=0; cc<3; cc++) {
        if (cc==0)
            blks = (coded_picture_width*coded_picture_height)>>6;
        else
            blks = (chrom_width*chrom_height)>>6;
        memcpy(auxDCT[cc], tmpDCT[cc], blks * sizeof(short [64]));
    }
    for(s=1;s<=duration;s++) {
```

Appendix -continued

```
        alpha=s/(double)duration;
        for (i=0; i<3; i++) {
            tmp[i] = oldrefDCT[i];
            oldrefDCT[i] = auxDCT[i];
            auxDCT[i] = tmp[i];
            newDCT[i]= auxDCT[i];
        }
        for (cc=0; cc<3; cc++) {
            if (cc==0)
                blks =
                    (coded_picture_width*coded_picture_height)>>6;
            else
                blks = (chrom_width*chrom_height)>>6;
            for (j=0; j<blks; j++) {
                for (k=0; k<64; k++)
                    newDCT[cc][j][k] = (short)
                    CLAMP(-2048,(1-alpha)*tmpDCT[cc][j][k]
                              +alpha*refDCT[cc][j][k],2047);
            }
        }
        /* use refoldDCT as reference frame for DPCM of P */
        putpictDCT(0);
    }
}
```

The invention claimed is:

1. A method for dissolving an incoming scene of video information which comprises a sequence of fields or frame of compressed video information and an outgoing scene of video information which comprises a sequence of fields or frame of compressed video information using a computer-based authoring and editing module, comprising the steps of:
   a. applying DCT domain motion inverse compensation to obtain DCT coefficients for all blocks of video information which make up a last frame of said outgoing video scene;
   b. applying DCT domain inverse motion compensation to obtain the DCT coefficients for all blocks of video information which make up the first frame of said incoming video scene; and
   c. creating a first frame in a dissolve region from said DCT coefficients of said last outgoing frame and said first incoming frame, said dissolve region being made playable as a transition between said outgoing and incoming scenes during playback of a video containing said outgoing and incoming scenes of video information.

2. The method of claim 1, further comprising the step of choosing an initial value for a weighing function prior to step (c).

3. The method of claim 2, further comprising the steps of
   d. incrementing said weighting function value; and
   e. creating a second frame in said dissolve region from said DCT coefficients of said last outgoing frame and said first incoming frame using said incremented weighing function value.

* * * * *